(12) United States Patent
Hagen et al.

(10) Patent No.: US 11,313,408 B2
(45) Date of Patent: Apr. 26, 2022

(54) BEARING DEVICE FOR MOTOR VEHICLE SHAFTS AND MOTOR VEHICLE SHAFT ASSEMBLY FOR A MOTOR VEHICLE

(71) Applicant: TRW Automotive GmbH, Alfdorf (DE)

(72) Inventors: Thomas Hagen, Krefeld (DE); Lars Ehrmann, Cologne (DE); Maria Hildebrand, Grevenbroich (DE); Atanasio Oliveira, Essen (DE)

(73) Assignee: ZF Automotive Germany GmbH, Alfdorf (DE)

( * ) Notice: Subject to any disclaimer, the term of this patent is extended or adjusted under 35 U.S.C. 154(b) by 286 days.

(21) Appl. No.: 16/545,323

(22) Filed: Aug. 20, 2019

(65) Prior Publication Data

US 2020/0063789 A1    Feb. 27, 2020

(30) Foreign Application Priority Data

Aug. 23, 2018 (DE) .......................... 102018120628.3

(51) Int. Cl.
  *F16C 3/035* (2006.01)
  *F16C 29/04* (2006.01)
  *B62D 1/20* (2006.01)

(52) U.S. Cl.
  CPC ............ *F16C 3/035* (2013.01); *F16C 29/046* (2013.01); *B62D 1/20* (2013.01); *F16C 2326/01* (2013.01); *F16D 2300/20* (2021.01)

(58) Field of Classification Search
  CPC .... F16C 3/035; F16C 29/046; F16C 2326/01; F16C 29/04; F16C 29/005; F16C 33/3887; F16D 2300/20; B62D 1/20; B62D 1/16; B62D 1/185

USPC ..................................................... 464/23, 167
See application file for complete search history.

(56) References Cited

U.S. PATENT DOCUMENTS

| 6,343,993 B1 * | 2/2002 | Duval ..................... F16C 3/035 464/167 |
| 2004/0041572 A1 | 3/2004 | Lin et al. |
| 2006/0156855 A1 | 7/2006 | Yukawa et al. |
| 2007/0157754 A1 * | 7/2007 | Yamada .................. F16C 3/035 |
| 2007/0163825 A1 | 7/2007 | Tokioka et al. |

FOREIGN PATENT DOCUMENTS

EP          1693579 A2    8/2006

* cited by examiner

*Primary Examiner* — Greg Binda
(74) *Attorney, Agent, or Firm* — Robert James Harwood

(57) ABSTRACT

A bearing device for motor vehicle shafts is described, in particular for motor vehicle steering shafts. The bearing device is provided for torque transmission between an inner shaft and the hollow shaft surrounded by the inner shaft. The inner shaft and the hollow shaft each have opposing bearing grooves, in which rolling elements are received. At least one positive locking cam in radial direction is provided. A safety contour is assigned to the positive locking cam, the safety contour comprising two engagement positions for the positive locking cam. In the case of unoccupied bearing grooves the positive locking cam is rotationally movable along the safety contour between the engagement points during a torque transmission, in a manner that a defined relative movement between the inner shaft and the hollow shaft is possible, which generates both tactile feedback and acoustic feedback. Furthermore, an automotive shaft assembly is described.

20 Claims, 4 Drawing Sheets

BEARING DEVICE FOR MOTOR VEHICLE SHAFTS AND MOTOR VEHICLE SHAFT ASSEMBLY FOR A MOTOR VEHICLE

CROSS-REFERENCE TO RELATED APPLICATIONS

This application claims priority to German Patent Application No. 102018120628.3, filed 23 Aug. 2018, the disclosure of which is incorporated herein by reference in its entirety.

TECHNICAL FIELD

The present disclosure relates to a bearing device for motor vehicle shafts, in particular for motor vehicle steering shafts for torque transmission between an inner shaft and a hollow shaft surrounding the inner shaft. Furthermore, the present disclosure relates to an automotive shaft assembly for a motor vehicle.

BACKGROUND

From the prior art, bearing devices for motor vehicle shafts are known, in particular for motor vehicle steering shafts, with which it is possible to adjust the motor vehicle shaft in the axial direction. This means that an axial displacement of the hollow shaft to the inner shaft is possible via the bearing device. For this reason, such motor vehicle shafts are generally referred to as telescopic motor vehicle shafts. Typically, it is provided for this purpose that the inner shaft and the hollow shaft have bearing grooves in which rolling elements are arranged, through which an axial displacement is ensured during the desired torque transmission.

It has been shown that in rare cases the rolling elements are lost or destroyed, which would then no longer enable a torque transmission. On the example of a motor vehicle steering shaft, this means that steering forces exerted by the driver could no longer be transmitted to a downstream steering gear or to the assigned wheels, which, as a result causes a total failure of the motor vehicle shaft assembly, i.e. the steering column assembly.

From the prior art it is known that for prevention of a total failure, for example, cams are provided in the inner shaft, which engage in corresponding grooves of the hollow shaft in a manner that a positive lock is ensured. In this respect, the motor vehicle can be further steered, even if the rolling elements have been destroyed or lost. In the case of an axial displacement, the cam slides in the groove in the axial direction, accordingly.

As a disadvantage, however, it has been found that the driver or a vehicle occupant does not notice the loss or destruction of the rolling elements, since the motor vehicle can still be steered basically in the usual manner.

In each case, a small air gap may be present between the grooves and the assigned cam so as not to interfere with axial displacement of the hollow shaft into the inner shaft. This gap is so small that only allows a slight steering play, but the driver does not notice it. So there is lack of a clear tactile feedback. This is because the steering play allowed by the air gap is so low that the driver does not associate it with the loss or destruction of the rolling element, but instead it is associated with age-related tolerances that occur during the operating time.

SUMMARY

It is the object of the present disclosure, in the event of loss or destruction of the rolling elements, to give better feedback to the vehicle occupant, and at the same time, to prevent a total failure of the motor vehicle shaft.

According to the present disclosure the task is solved by a bearing device for motor vehicle shafts, in particular, motor vehicle steering shafts, for transmission of torque between an inner shaft and a hollow shaft surrounding the inner shaft, wherein the inner shaft and the hollow shaft have opposite bearing grooves, into which the rolling elements are received, wherein at least one positive locking cam in radial direction is provided. A safety contour is assigned to the positive locking cam, wherein the safety contour comprises two engagement points for the positive locking cam, wherein the positive locking cam, in the case of unoccupied bearing grooves, is rotationally movable along the safety contour between the two engagement points during a torque transmission, in a manner that a defined relative movement between the inner shaft and the hollow shaft is possible, which generates both tactile feedback and acoustic feedback.

The basic idea of the present disclosure is that, in the event of loss or destruction of the rolling elements, i.e. in the case of unoccupied bearing grooves, there is such a large steering play on the basis of the defined relative movement between the inner shaft and the hollow shaft, that the driver will clearly notice this, that is, there will be a clear tactile feedback. The positive locking cam moves along the safety contour during the defined relative movement until the positive locking cam gets in contact with the corresponding engagement point provided for this purpose. If this is the case, a torque transmission is still possible despite the unoccupied bearing grooves, namely by virtue of the existing positive lock.

Thus, the positive locking cam now is not received in a groove, which means that only a small air gap is present between the positive locking cam and an assigned wall of the groove. Such air gap should be bridged in case of unoccupied bearing grooves, but this would only enable a slight relative rotation, which is not perceptible as tactile feedback, though. Rather, the present disclosure provides that the positive locking cam displaces rotationally along the correspondingly designed safety contour, thus initially covering a long motion range, until the positive locking cam stops at the respective engagement point.

The movement of the positive locking cam along the safety contour corresponds to the defined relative movement, which is perceived by the driver as tactile feedback. On the basis of the associated motion range linked with the defined relative movement that is correspondingly large, this tactile feedback may indicate the driver an error in the steering system, in particular, in the unoccupied bearing grooves, in particular, e.g. the loss or destruction of the rolling elements. In this respect, there is a clear tactile feedback. The driver will therefore intuitively visit a workshop to have the possible error in the steering system checked. For this purpose, the safety contour can be longer than the bearing groove, especially viewed in the circumferential direction. For example, the safety contour extends over an angular range of at least 8°, e.g. over an angular range of 12°.

In addition, the bearing device generates an acoustic feedback in a manner that the vehicle driver or a vehicle occupant can hear a mechanical noise that occurs when the positive locking cam stops at one of engagement points after such cam has displaced along the safety contour. The acoustic feedback can therefore correspond to a mechanical click noise. The positive locking cam and/or the engagement point, respectively, may be designed for this purpose, that is, to generate or amplify the acoustic feedback. However, the acoustic feedback is already generated in a satisfactory way by virtue of the correspondingly large relative rotation, as far as the inner shaft and the hollow shaft are made in a conventional manner.

Accordingly, it is ensured that the vehicle occupant in each case notices that something is wrong with the vehicle shaft, in particular the bearing device, since in addition to the increased steering play (tactile feedback) an acoustic feedback such as a click or the like takes place. Especially when the cams are received in the grooves by virtue of the minimal motion range, no acoustic feedback or perceptible acoustic feedback in the vehicle interior could be generated. A tactile feedback that possibly was not perceived, or a greater steering play that was incorrectly perceived as a wear-related cause, are now perceived acoustically in any case. In this manner a feedback redundancy has been created.

Therefore, the bearing device includes a torque transmission safety in the event of failure of the rolling elements, which is ensured by a positive lock between the inner contour of the hollow shaft and the outer contour of the inner shaft, that is, the positive locking cam and the safety contour, in particular by their engagement points. This results in a mechanical redundancy with respect to the torque transmission, so that in the event of loss or destruction of the rolling elements, a torque transmission is still possible by virtue of the form-locking rotation of the motor vehicle shaft. In particular, the form-locking rotation is set in a manner that the relative rotation remains below a level of twisting or steering play, assessed by the original equipment manufacturer (OEM) as a steering failure, for example, below 20°.

Generally, the rolling elements are received in the opposite bearing grooves in a positive-lock manner, in a way that they are arranged firmly in the bearing grooves. Neither the bearing grooves nor the rolling elements are spring loaded. Only their inherent elasticity is taken into account since they have been elastically pre-stressed. However, this publication does not relate to externally pre-stressed bearing grooves or rolling elements, which are pre-stressed via external springs or other external devices. The positive locking cam may be provided on the outside or the outer contour of the inner shaft, whereas the safety contour is provided on the inside or the inner contour of the hollow shaft.

One aspect provides that the inner shaft and the hollow shaft are axially displaceable to each other. Accordingly, this allows the length of the motor vehicle shaft to be adjusted telescopically. This is particularly important for telescopic steering shafts, which are provided for example in (autonomous driving) motor vehicles with a stowable steering column. The rolling elements ensure that the hollow shaft can be moved in the axial direction relative to the inner shaft.

Another aspect provides a plurality of rolling elements, which are coupled to each other in the axial direction through at least one chain link, in order to form an axial rolling element chain, and in particular wherein a plurality of rolling element chains are distributed axially over the circumference. The chain link can also be referred to as a cage or rolling element cage in which the rolling elements are received and held. Through the multiple circumferentially-distributed rolling element chains it is also ensured that the forces occurring can be distributed as homogeneously as possible in order to reduce wear.

A correspondingly long bearing groove for the rolling element chain can be provided in the hollow shaft and the inner shaft respectively, to receive the rolling element chain. Through mechanical engagement points the respective rolling element chain is fixed in a predefined position in the axial direction, that is, for example, in a positive-lock manner.

Also, viewed in axial direction a plurality of bearing grooves can be provided in succession, in each of which a rolling element chain is received. In this way, the adjustment range can be extended accordingly. In particular, this may be important for multiple-unit steering column assemblies or steering column assemblies with a long axial adjustment range, for example, in an autonomous driving motor vehicle or a vehicle with a stowaway steering column. By virtue of the plurality of rolling elements or rolling element chains arranged in the axial direction is ensured that, viewed in the axial direction, a long adjustment range is provided, in a manner that the steering column is stowable in the axial direction.

The plurality of rolling element chains may be different in each case, in a manner that the rolling element chains can be arranged only at appropriately assigned points of the bearing device, which are formed for the assigned rolling element chain accordingly. This can thus, among other things, ensure a load-bearing arrangement of the rolling element chains, that is, an arrangement that complies with the bearing load during operation.

For example, rolling element chain recesses adjacent to the bearing grooves are provided, wherein the rolling element recesses are formed to partially receive the chain link. This results in a unique installation situation, since the rolling element chain should be arranged into the specially provided rolling element chain recesses. In addition, the load on the chain link can be reduced since the chain link is received in the specially provided recess, namely, the rolling element chain recess. The wear and tear and risk of failure can thus be further reduced.

But there can be also provision that the plurality of rolling element chains are constructed uniformly in a manner that the installation is simplified and the installer does not need to pay extra attention on how to engage the rolling element chains in the provided bearing grooves.

Generally, at least the rolling element chain recesses and/or one axial rolling element chain can be formed in a manner according to the Poka-Yoke principle, so that the bearing device can be mounted only in a defined fashion. Accordingly, a faulty assembly can be prevented, since the rolling element chain(s) can only be inserted in the predefined manner. It is thus avoided that a bearing groove is coupled with a positive locking cam, whereby the rolling elements between a bearing groove and a safety contour would be arranged. In this respect, the rolling element chain recesses together with the rolling element chain ensure that the bearing device can be mounted only in the intended manner.

The positive locking cam, an adjacent rolling element chain recess and an adjacent bearing groove may pass respectively into each other. In this respect, this occurs in the corresponding contour, for example, in the outer contour of the inner shaft, that is, the positive locking cam passes into the adjacent rolling element chain recess, which in turn passes directly into the adjacent bearing groove. In this respect, each section in the outer contour of the inner shaft has a corresponding function. The rolling element chain recesses are provided in each case between a positive locking cam and a bearing groove.

In an analogous manner, the safety contour, an adjacent rolling element chain recess and an adjacent bearing groove each pass into each other. Therefore, the corresponding contour, for example, the inner contour of the hollow shaft, also has correspondingly direct junctions in a manner that each region of the inner contour of the hollow shaft fulfills a function. The rolling element chain recesses are respectively provided between a safety contour and a bearing groove.

The positive locking cam may have a convex shape, viewed in the radial direction. Alternatively or additionally, the safety contour is designed to be partially circular. In particular, the radius of the convex-shaped positive locking cam is different from the radius of the partially circular safety contour. On the basis of the corresponding shapes of the positive locking cam and/or the safety contour, in particular because of the different radii, it is ensured that the positive locking cam is displaceable along the safety contour with a correspondingly long movement, that is, the movement takes place over a correspondingly long motion range, which would not be the case if a cam is engaged to the groove.

However, this large relative rotation is important in order to generate both the tactile feedback and the acoustic feedback, through which the driver can perceive the absence of the rolling elements or its destruction. The acoustic feedback can also be perceived by another vehicle occupant, such as a passenger and/or a driver of a self-driving vehicle. In general, by virtue of the tactile and acoustic feedback the driver will be required to visit a workshop.

Generally, it is provided that the positive locking cam in the normal state, i.e. in the case of occupied bearing grooves, is assigned to the center of the safety contour. This means that the two engagement points that are provided on opposite ends of the safety contour, each are located at an essentially equal distance from the initial position of the positive locking cam. In this respect, it is ensured that the relative movement of the positive locking cam in both directions of rotation along the safety contour is essentially the same.

According to a further aspect, the defined relative movement, in the case of unoccupied bearing grooves, comprises a predefined rotation angle—degree in a direction of rotation of less than 10°, for example, a predefined rotation angle degree of up to 8°, in particular a predefined rotation angle degree of 6°. This ensures that there is a maximum torsional rigidity and steering play, for example 20°, which is specified by the original equipment manufacturer (OEM) or by the OEM customers. Thus, in case of a rotation angle degree of up to 6°, there is an increased steering play of maximum 12°, which the driver can observe in a tactile manner. This is because each rotation angle degree is viewed in a direction from the initial position, whereas the rotation or steering play covers the angle range in both directions and thus it is essentially twice as large as the rotation angle degree.

In addition, the predefined rotation angle degree in the case of unoccupied bearing grooves is greater than a wear-related and/or tolerance—related rotation angle degree. Thus, the predefined rotation angle degree is, for example, greater than the rotation angle degree that occurs when bridging an air gap, which for example, corresponds to a rotation angle degree of about 2°. Accordingly, the driver recognizes the tactile feedback that provides the bearing device in the event of loss or destruction of the rolling elements. The driver can also distinguish such feedback from an age-related or tolerance-related rotation angle degree, which is correspondingly lower. This would not be the case, if only one cam were allocated in a reception groove, while bridging a small air gap. In this situation, there is a rotation angle degree that corresponds to a tolerance-related rotation angle degree. In other words, the predefined rotation angle degree can thus be greater than 2°.

In particular, a plurality of positive locking cams are provided, wherein each positive locking cam is arranged between two bearing grooves, and/or a plurality of safety contours are provided, wherein each safety contour is arranged between two bearing grooves. This results in a correspondingly homogeneous power transmission provided that a torque transmission takes place in the event of loss or destruction of the rolling elements, that is, in the case of unoccupied bearing grooves.

For example, the inner shaft has a polygonal outer contour, in particular a hexagonal outer contour. Alternatively or additionally, the hollow shaft has a circular-cylindrical outer contour. On the basis of the different contours of the inner shaft and the outer shaft, a mechanical positive lock can be manufactured in a simple manner, which provides the mechanical redundancy if the rolling elements are destroyed or lost. Generally, the inner shaft may be developed as a solid body. This ensures that correspondingly high forces can be transmitted. The hollow shaft and/or the inner shaft can be cold-formed. The corresponding contours of the hollow shaft and/or the inner shaft can thus be manufactured in a simple and cost-effective manner.

Further, the present disclosure relates to a motor vehicle shaft assembly for a motor vehicle, in particular a steering column assembly comprising a bearing device of the aforementioned type, a sensor which detects the relative movement between the inner shaft and the hollow shaft, and a control and/or computing unit, which receives data detected by the sensor, and is configured to determine whether the detected relative movement is within the range of the predefined relative movement.

In general, the present disclosure also relates to an automotive shaft assembly for a motor vehicle, in particular a steering column assembly comprising the aforementioned type of bearing device. In this respect, there is a further redundancy, since in addition to the tactile feedback and the acoustic feedback, a sensor detects whether the occurring relative movement is within the range of the predefined relative movement, which occurs when the rolling elements have been lost or destroyed. The predefined relative movement is known due to the configuration of the bearing device, so that a corresponding limit value or threshold value, based on the predefined relative movement is stored in a memory of the control and/or computing unit. If the occurring relative movement is within the range of the predefined relative movement, in particular above the limit or threshold value, the control and/or computing unit can provide an optical message to the driver or the vehicle occupant in a manner that such message is transmitted, for example, via a display device. The display device may be an information system of the motor vehicle. The optical communication or message may request the driver to take the vehicle to a workshop for inspection. In general, therefore, a further redundancy is created, in case that neither the tactile feedback nor the acoustic feedback are perceived.

In particular, the motor vehicle shaft assembly comprises an intermediate steering shaft, so that the motor vehicle shaft assembly corresponds to a steering column assembly. The intermediate steering shaft is used to transmit the steering movement of the steering wheel to the wheels, in particular to a steering gear assigned to the wheels.

BRIEF DESCRIPTION OF THE DRAWINGS

Hereinafter the present disclosure shall be illustrated in detail by way of an embodiment and with reference to the enclosed drawings, wherein.

DETAILED DESCRIPTION

Figure 1:
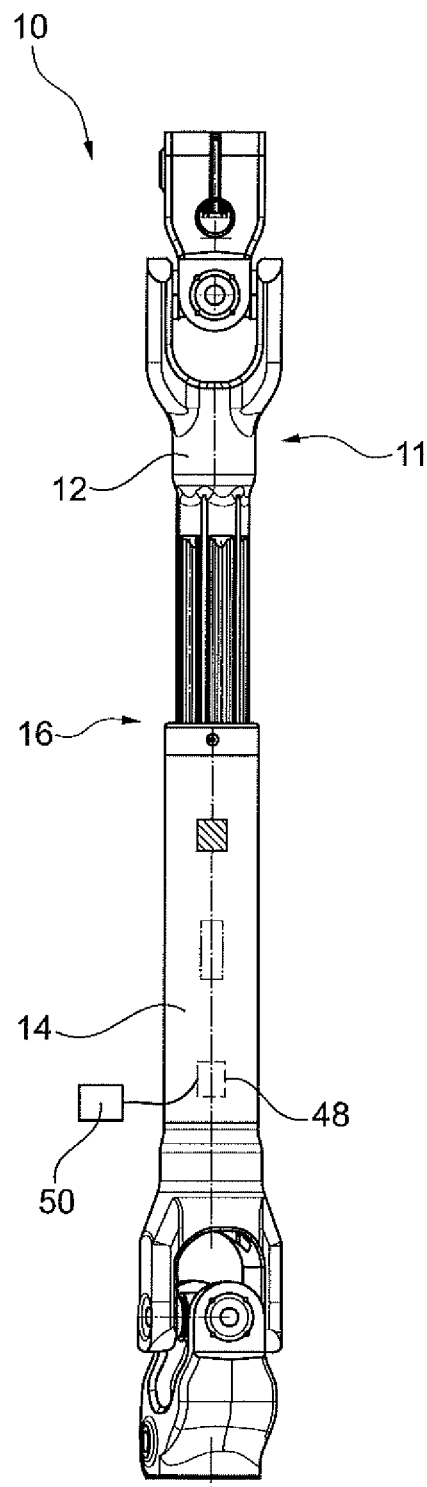
FIG. 1 shows a perspective view of a motor vehicle shaft assembly according to the present disclosure with a bearing device according to the present disclosure.

FIG. 1 shows an automotive shaft assembly 10 for a motor vehicle having a motor vehicle shaft, wherein the illustrated automotive shaft assembly 10 is a steering column assembly comprising an intermediate steering shaft 11, which is usually provided between a steering wheel and a steering gear. The automotive shaft assembly 10, in particular the intermediate steering shaft 11 comprises an inner shaft 12 and a hollow shaft 14 surrounding the inner shaft 12, which are mutually axially adjustable. For this purpose, the automotive shaft assembly 10 comprises a bearing device 16, which is developed at least partially through the inner shaft 12 and the hollow shaft 14, as will be explained below, with particular reference to FIGS. 2 to 4.

Figure 2:
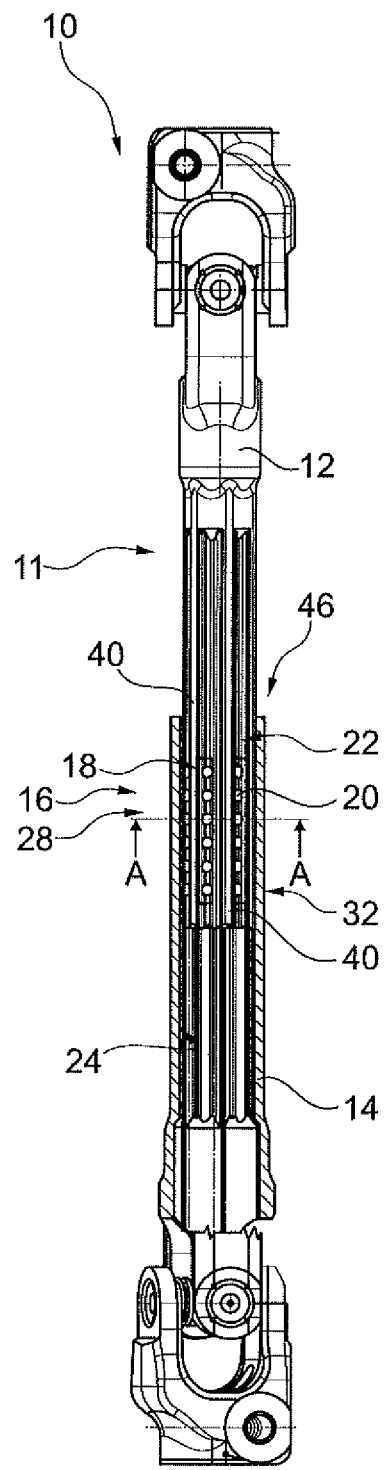
FIG. 2 shows a partial sectional view of the motor vehicle shaft assembly of FIG. 1 along a longitudinal axis.
Figure 3:
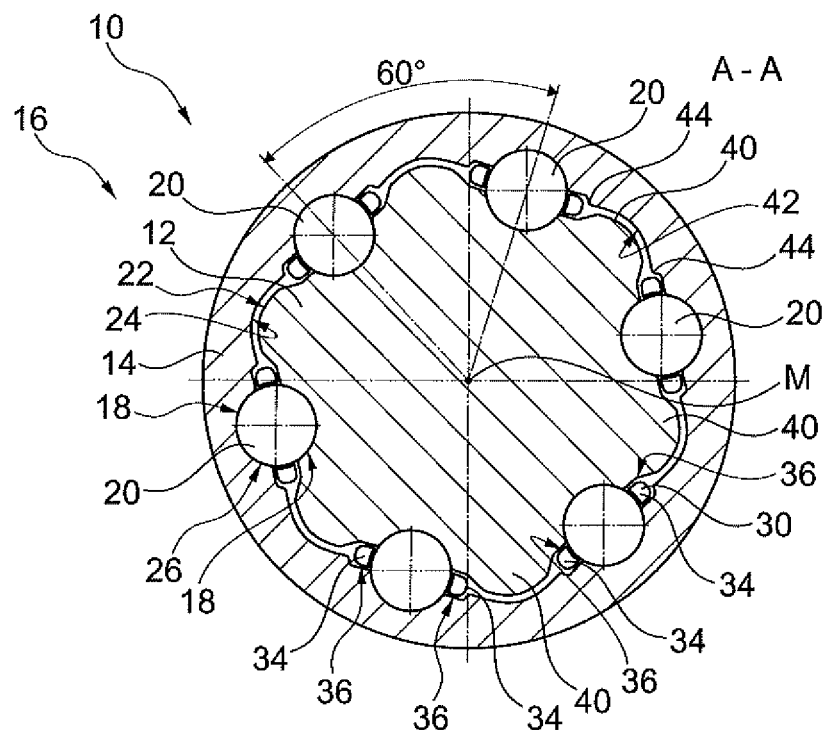
FIG. 3 shows a cross-sectional view of the motor vehicle shaft assembly of FIGS. 1 and 2.

The bearing device 16 comprises a plurality of bearing grooves 18, in which the rolling elements 20 are received in a positive-lock manner, as can be seen in FIG. 3, which shows a cross section of the automotive shaft assembly 10 along the line AA in FIG. 2. The bearing grooves 18 are respectively formed in the outer contour 22 of the inner shaft 12 and the inner contour 24 of the hollow shaft 14. The bearing grooves 18 are opposite each other, in a manner that two opposite bearing grooves 18 each form a receiving space 26 for the rolling elements 20. The respective reception space 26 is essentially filled in by the rolling element 20, since the rolling elements 20 are each received in a positive-lock manner, as can be seen in FIG. 3. It is also clear from FIG. 2 that the bearing grooves 18, as viewed in axial direction, extend over an axial distance in a manner that a plurality of rolling elements 20 are received in a bearing groove 18. As a result, a correspondingly long axial adjustment range 28 occurs, over which the hollow shaft 14 can be adjusted translationally in the axial direction relative to the inner shaft 12.

Figure 5:
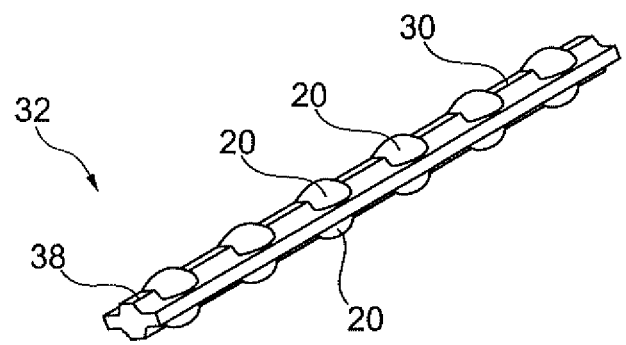
FIG. 5 shows a rolling element chain in a perspective view, which is used in a bearing device according to the present disclosure of a motor vehicle shaft assembly according to the present disclosure.

The plurality of rolling elements 20 arranged in axial direction are coupled at least through one chain link 30 to one another, in a manner that an axial rolling element 32 is formed, which is shown in perspective in FIG. 5 and will be discussed later. It is also clear from FIG. 2 that a plurality of rolling element chains 32 are distributed over the circumference of the bearing device 16, in particular of the hollow shaft 14 and/or the inner shaft 12, whereby a correspondingly uniform force distribution is ensured during a torque transmission.

Figure 6:
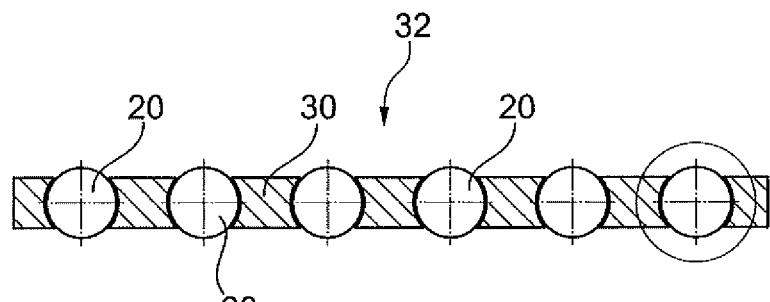
FIG. 6 shows a longitudinal section through the rolling element chain of FIG. 5.

The rolling element chain 32 comprises the chain link 30 formed as a cage or rolling element cage, in which the rolling elements 20 are received, which are arranged in the axial direction of the motor vehicle shaft assembly 10 in a row, as can be seen, inter alia, in FIG. 2. In case that the rolling element chains 32 are mounted or used in the motor vehicle shaft assembly 10, the chain link 30 is formed in a manner that the rolling elements 20 extend respectively over the chain link 30, so that they directly interact with the bearing grooves 18, as can be seen, inter alia, in FIGS. 3, 5 and 6.

Figure 7:
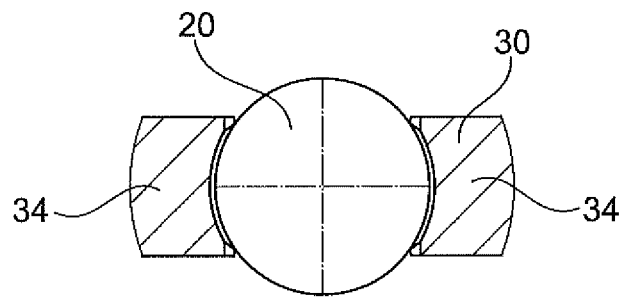
FIG. 7 shows a cross-sectional view of the rolling element chain of FIG. 5.
Figure 8:
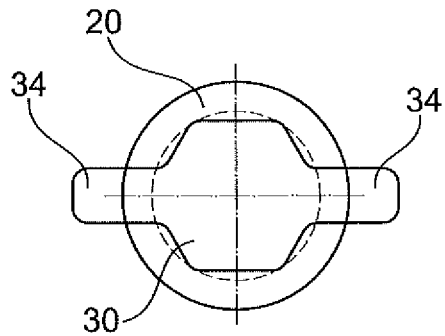
FIG. 8 shows a further cross-sectional view of the rolling element chain of FIG. 5.

Furthermore, the chain link 30 comprises laterally extending projections 34 (see FIGS. 5, 7 and 8), which are received in rolling element chain recesses 36 of the bearing device 16 provided for this purpose, as shown in FIG. 3. This ensures, inter alia, that the load on the rolling element chain 32, in particular on the chain link 30, is reduced during operation in a manner that wear of the rolling element chain 32 can be prevented.

Furthermore, it is ensured that during assembly of the bearing device 16 the inner shaft 12 and hollow shaft 14 are properly aligned with each other in a manner that an incorrect assembly is prevented. In this respect, the rolling element chain recesses 36 and/or the rolling element chain 32, in particular the relevant chain link 30, guarantee that the bearing device 16 can be assembled only in a defined manner. This is generally referred to as the Poka-Yoke principle.

By appropriate shaping of the rolling element chain recesses 36 and/or the chain link 30, the Poka-Yoke principle can be guaranteed in a simple manner. The rolling element chain recesses 36 are provided adjacent to the assigned bearing grooves 18, wherein the rolling element recesses are formed 36 in a manner that they can, at least partially, receive the chain link 30, in particular, the lateral projections 34 of the chain link 30.

In addition, the rolling element chain 32 may have a marking area 38, which clearly identifies the rolling element chain 32. In particular, the installation position of the rolling element chain 32 may be specified in the marking area 38, for example, a color coding. This makes it possible that during assembly of the bearing device 16 the rolling element 32 is inserted at the assigned location. In this respect, a clear allocation of the rolling element chains 32 to the respective bearing grooves 18 is possible. Generally, the rolling element 20 can be held in a positive-lock manner via a four-point contact in the receiving space 26, wherein in each case two point contacts P per bearing groove 18 are provided, as is clear from the detailed view of FIG. 9, in which a bearing groove 18 is shown with the rolling element 20 received therein.

Figure 9:
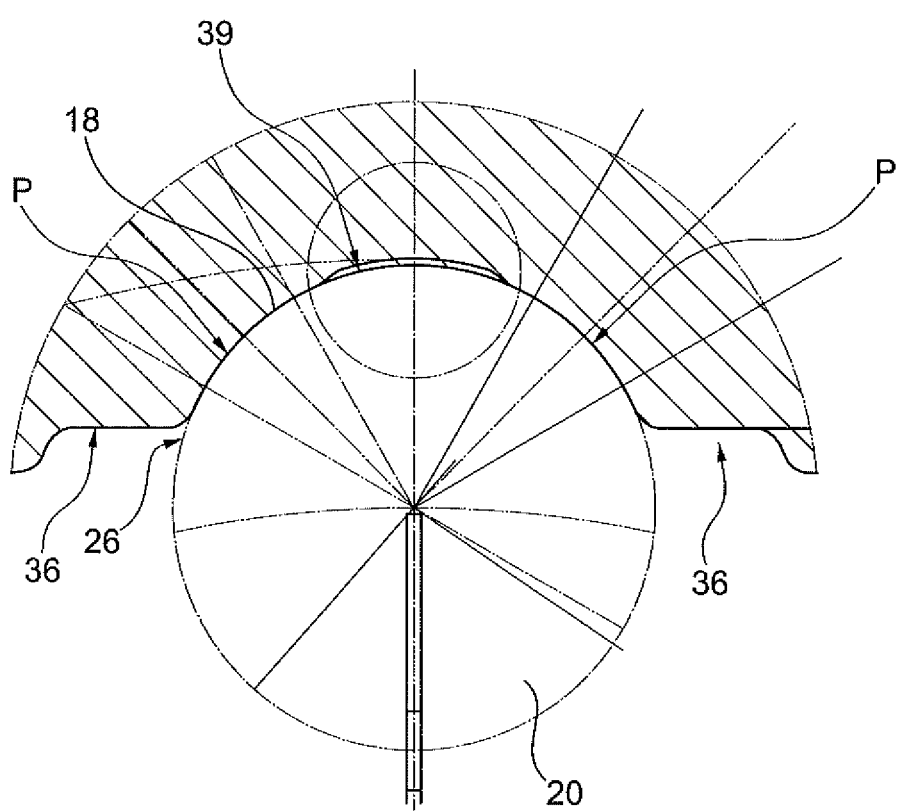
FIG. 9 shows a detailed view of FIG. 3.

The bearing grooves 18 viewed in cross-section, may have a shape not similar to a pitch circle, for example, a gothic shape. Thus, in each case some space can be provided in the bearing grooves 18 for a lubricating region 39, in which a lubricant is applied, for example in the tip of the respective bearing groove 18, as shown in FIG. 9. In particular, it is clear from FIGS. 3 and 4, that the bearing device 16 has a plurality of radially extending positive locking cams 40. In the illustrated embodiment, the positive locking cams 40 are arranged in the outer contour 22 of the inner shaft 12. The positive locking cam 40 is assigned to a safety contour 42, along which the positive locking cam can move rotatably 40, as will be explained below. In the illustrated embodiment, the safety contour 42 is formed in the inner contour 24 of the hollow shaft 14.

The safety contour 42 comprises two engagement points 44 for the positive locking cam 40 in a manner that the positive locking cam 40 is rotationally movable along the safety contour 42 between the two engagement points 44, as long as the bearing grooves 18 are unoccupied. This is the case, for example, when the rolling elements 20 have been destroyed or lost. Due to the positive locking cam 40 and the safety contour 42 comprising the engagement points 44 then, a torque transmission between the inner shaft 12 and the hollow shaft 14 is still possible, since there is a mechanical positive lock between the inner shaft 12 and the hollow shaft 14, in particular between the positive locking cam 40 and the respective engagement point 44 of the safety contour 42.

In this respect, in the case of unoccupied bearing grooves 18, the positive locking cam 40 is rotationally movable along the safety contour 42 between the engagement point 44 during a torque transmission, in a manner that a defined relative movement between the inner shaft 12 and the hollow shaft 14 is possible. The defined relative movement corresponds to a relative rotation of the inner shaft 12 to the hollow shaft 14 by a predefined rotation angle degree a in a direction below 10°, for example, a predefined rotation angle degree a of up to 8°. The predefined rotation angle degree a can generally be specified by an OEM or by an OEM customer.

Figure 4:
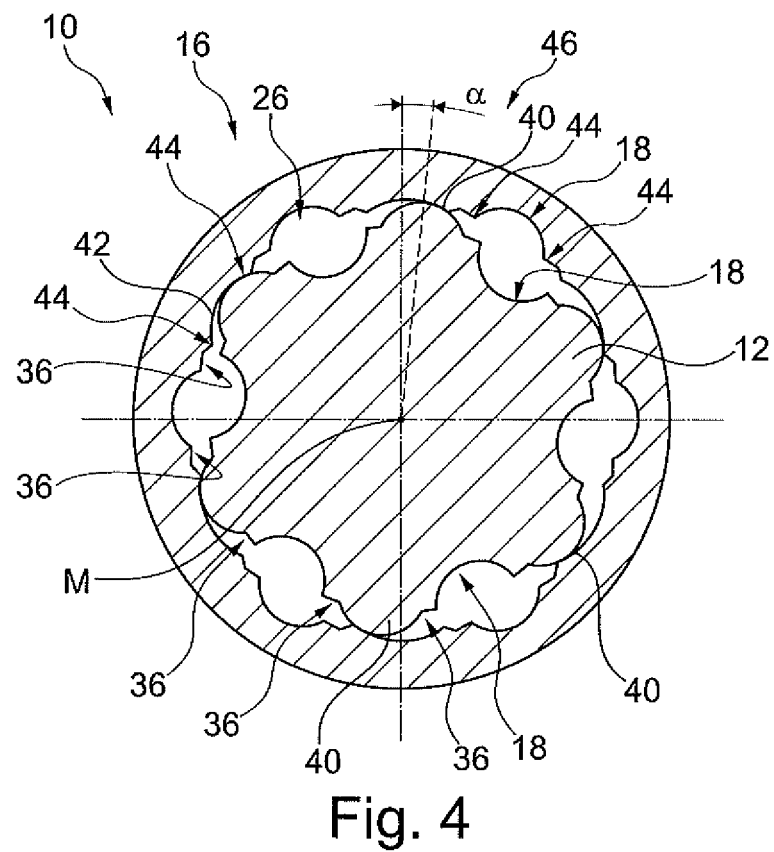
FIG. 4 shows the representation of FIG. 3 in the case of unoccupied bearing grooves.

In the embodiment shown, the defined relative movement is a predefined rotation angle degree a of up to 6° in the case of unoccupied bearing grooves 18, as can be seen in particular in FIG. 4, which shows a positive locking position in unoccupied bearing grooves 18, in which the positive locking cam 40 is fitted to one of the two engagement points 44. This rotation angle degree a is therefore greater than a wear-related and/or tolerance-related rotation angle degree, which is usually in the range of about 2°.

As can be seen in FIG. 3, the positive locking cam 40 in the initial state, i.e. with existing rolling elements 20 and occupied bearing grooves 18, is assigned to the center of the safety contour 42 in a manner that the rotation angle degree a for both directions of rotation is essentially the same. In the embodiment shown (rotation angle degree a of 6°) there is a higher steering clearance of a maximum of 12°, as long as the rolling elements 20 have been destroyed or lost. This increased steering play that is associated with the defined relative movement of the positive locking cam 40 towards the safety contour 42, is perceived by the driver as tactile feedback in a manner that he can still steer the vehicle by virtue of to the positive lock, while the driver still notices some problem. On the basis of the relatively large defined rotation angle degree a and the assigned steering play, i.e. the corresponding relative movement, it is ensured that the driver can distinguish the steering play from age-related steering plays. So it is guaranteed that the steering play is recognized as tactile feedback with respect to the loss or destruction of the rolling elements 20.

In general, the defined relative movement of the positive locking cam 40 along the safety contour 42 is ensured by the fact that the positive locking cam 40 has a convex shape viewed in the radial direction, wherein the safety contour is formed 42 in a part-circular manner. As a result, a corresponding motion range is formed, along which the positive locking cam 40 can move. The positive locking cam 40 and the safety contour 42 also have different radii, in a manner that the relative movement is possible over an accordingly defined long path or a correspondingly long motion range. This is perceived by the driver as tactile feedback. Furthermore, an acoustic feedback is provided in addition to the tactile feedback, in a manner that there is a redundant feedback, namely, tactile and acoustic feedback.

The acoustic feedback is generated because of the long motion range in the case of unoccupied bearing grooves 18, when the positive locking cam 40 at the appropriate engagement point 44 is fixed. The engagement point 44 of the safety contour 42 and/or the positive locking cam 40 can be designed accordingly to amplify the acoustic feedback. In particular, the additional acoustic feedback ensures that a further vehicle occupant can acoustically determine that there is some problem with the bearing device 16 and the motor vehicle shaft assembly 10. This is particularly important for inexperienced drivers.

As can be seen in FIG. 4, in which the rolling elements are not shown 20, for example, due to their loss or destruction, it is clear that the positive locking cam 40, the adjacent rolling element chain recess 36 and the adjacent bearing groove 18, pass directly into one another. This means that the entire outer contour 22 of the inner shaft 12 is composed of functional sections, i.e. sections with a corresponding function. In an analogous manner, this applies to the inner contour 24 of the hollow shaft 14, since there the safety contour 42, an adjacent rolling element chain recess 36 and the adjacent bearing groove 18 also pass directly into each other. Also, in this case, each section of the inner contour 24 fulfills a function, that is, functional sections are included.

In the embodiment shown, the inner shaft 12 is provided with a hexagonal outer contour 22, which is essentially formed by the positive locking cam 40. In this respect, the inner shaft 12 includes in total six positive locking cams 40, which are arranged respectively between two bearing grooves 18. The hollow shaft 14, however, has a cylindrical outer contour, wherein the inner contour 24 of the hollow shaft 14 is formed in a manner that a plurality of safety contours 42 are provided, in particular the number of positive locking cams 40, accordingly. Each safety contour 42 is also arranged between two bearing grooves 18. Both the inner shaft 12, formed as a solid body, and as well the hollow shaft 14 can be cold formed in a manner that they can be manufactured cost-effectively.

Generally, thus, over the inner contour 24 of the hollow shaft 14 and the outer contour 22 of the inner shaft 12, a torque transmission safety 46 is created, which becomes active in the event of failure of the rolling elements 20. The torque transmission safety 46 is secured over the positive lock of the inner contour 24 of the hollow shaft 14 and the outer contour 22 of the inner shaft 12 in accordance with the defined relative movement between the inner shaft 12 and the hollow shaft 14.

FIG. 1 also shows schematically that the motor vehicle shaft assembly 10 additionally comprises a sensor 48 and a control and/or computing unit 50, which receives the data collected by the sensor 48. The control and/or computing unit 50 is configured to monitor the data collected by the sensor 48 as to whether the relative movement detected by the sensor 48 is within the range of the predefined relative movement. As a result, the control and/or computing unit 50 can detect whether the existing relative movement between the inner shaft 12 and the hollow shaft 14 corresponds to a relative movement that occurs by virtue of the absence or destruction of the rolling elements 20. The control and/or computing unit 50 can then control a display of the motor vehicle to additionally provide an optical warning signal to the driver.

In addition to the tactile feedback and acoustic feedback, the driver then also receives optical feedback. Thus, the driver is informed in three different manners that he should stop at a workshop for checking the bearing device 16 and the motor vehicle shaft assembly 10.

What is claimed is:

1. A bearing device for motor vehicle steering shafts comprising:
    an inner shaft;
    a hollow shaft surrounding the inner shaft;
    wherein the inner shaft and the hollow shaft each have respectively opposite bearing grooves, in which rolling elements are received, and
    wherein at least one positive locking cam in radial direction is provided, the positive locking cam being assigned to a safety contour formed by a plurality of engagement points for the positive locking cam, the positive locking cam being rotationally movable along the safety contour between the engagement points during a torque transmission in an unoccupied bearing groove such that a defined relative rotational movement between the inner shaft and the hollow shaft is possible which generates both tactile feedback and acoustic feedback, the tactile feedback and acoustic feedback being configured to be perceptible to a vehicle occupant.

2. The bearing device according to claim 1 wherein the inner shaft and the hollow shaft are mutually axially displaceable.

3. The bearing device according to claim 1 wherein a plurality of rolling elements is provided, which are coupled in the axial direction through at least one chain link to form an axial rolling element chain and wherein the plurality of rolling element chains are distributed axially over the circumference.

4. The bearing device according to claim 3 wherein rolling element chain recesses are provided adjacent to the bearing grooves and wherein the rolling element chain recesses are formed to partially receive the chain link.

5. The bearing device according to claim 4 wherein at least the rolling element chain recesses and the axial rolling element chain are formed in a manner according to the Poka-Yoke Principle, so that the bearing device can only be mounted in a defined manner.

6. The bearing device according to claim 1 wherein the positive locking cam, an adjacent rolling element chain recess, and an adjacent bearing groove are passed respectively into each other and/or in a manner that the safety contour, an adjacent rolling element chain recess and an adjacent bearing groove are passed respectively into each other.

7. The bearing device according to claim 1 wherein the positive locking cam has a convex shape, viewed in the radial direction, and that the safety contour is partially circular, when the radius of the convex shaped positive locking cam is different from the radius of the partially circular safety contour.

8. The bearing device according to claim 1 wherein the defined relative rotational movement comprises a predefined rotation angle degree in a direction of rotation which is below 10°.

9. The bearing device according to claim 8 wherein the predefined rotation angle degree in the case of unoccupied bearing grooves is greater than a rotation angle degree in which the inner shaft and the hollow shaft are rotatable relative to one another in the case of occupied bearing grooves.

10. The bearing device according to claim 1 wherein a plurality of positive locking cams is provided, wherein each positive locking cam is arranged between two bearing grooves, and that a plurality of safety contours is provided, wherein each safety contour is arranged between two bearing grooves.

11. The bearing device according to claim 1 wherein the hollow shaft and the inner shaft are each cold formed.

12. The bearing device according to claim 1 wherein rolling elements directly engage both the inner shaft and the hollow shaft.

13. The bearing device according to claim 1 wherein the positive locking cam is prevented from engaging the engagement points when the rolling elements occupy the bearing grooves.

14. The bearing device according to claim 1 wherein the defined relative rotational movement comprises a predefined rotation angle degree of at least 2° in a direction of rotation from an initial position.

15. The bearing device according to claim 1 wherein the defined relative rotational movement comprises a predefined rotation angle degree of at least 6° in a direction of rotation from an initial position.

16. The bearing device according to claim 1 wherein the positive locking cam travels over an angular range of at least 12° from one engagement point to the other.

17. The bearing device according to claim 1 wherein the acoustic feedback is generated when the positive locking cam engages either one of the engagement points.

18. A bearing device for motor vehicle steering shafts, comprising:
    an inner shaft having bearing grooves;
    a hollow shaft surrounding the inner shaft and having bearing grooves, each bearing groove of the hollow shaft forming a receiving space with an associated bearing groove of the inner shaft;
    rolling elements occupying the receiving spaces in an occupied state of the bearing device, the bearing device having an unoccupied state in which the rolling elements do not occupy the receiving spaces;
    at least one radially extending positive locking cam; and
    at least one safety contour associated with the at least one positive locking cam, the at least one safety contour having two engagement points, the at least one positive locking cam being rotationally movable along the at least one safety contour between the two engagement points when in the unoccupied state, a maximum relative rotational movement of the inner and hollow shafts, in the unoccupied state, being defined by an angular degree in which the positive locking cam is rotationally movable from one engagement point to the other engagement point;
    wherein in the unoccupied state, the relative rotational movement of the inner and hollow shafts generates a tactile feedback that is configured to be perceptible to a vehicle occupant, and the at least one positive locking cam striking either of the engagement points generates an acoustic feedback that is configured to be perceptible to the vehicle occupant.

19. The bearing device according to claim 18 wherein the angular degree in which the positive locking cam is rotationally movable from one engagement point to the other engagement point in the unoccupied state is at least 12°.

20. The bearing device according to claim 18 wherein the rolling elements directly engage both the inner shaft and the hollow shaft in the occupied state.

\* \* \* \* \*